Jan. 29, 1957 J. R. CROSSAN 2,779,381
PNEUMATIC TIRE
Filed July 19, 1952
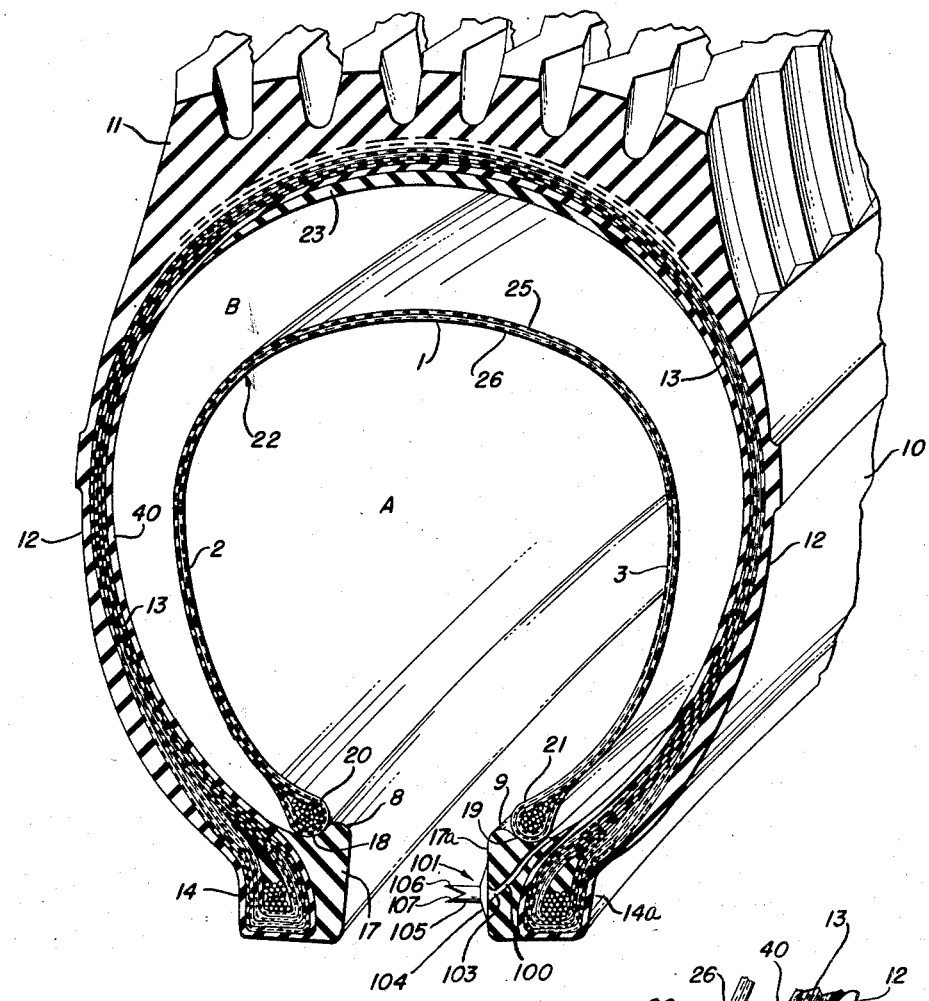
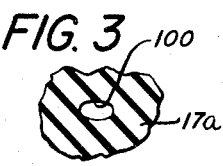
INVENTOR.
JESSE R. CROSSAN
BY
W. A. Fraser
ATTORNEY United States Patent Office 2,779,381
Patented Jan. 29, 1957

2,779,381

PNEUMATIC TIRE

Jesse R. Crossan, Wadsworth, Ohio, assignor to The Firestone Tire & Rubber Company, Akron, Ohio, a corporation of Ohio Application July 19, 1952, Serial No. 299,852

9 Claims. (Cl. 152—342)

This invention relates to pneumatic tires of a tubeless type and has broadly as its object the provision of safety means for preventing the complete collapse of a tire in the event of a blowout or large puncture of the tire.

In the tubeless tire of the present invention, safety means are embodied in the tire which means provided an auxiliary load-carrying member that comes into functional operation when a tire blows out, thereby preventing a complete collapse of the tire and thus enabling the driver of an automobile, on which the tire blowout occurs, to slow down or stop without the car swerving or getting out of control.

The invention contemplates the provision of a tire adapted for use upon a standard tire rim in which diaphragm seats are provided on an inner wall of the wire on ledges adjacent the beads thereof, said seats being adapted to receive inextensible marginal edges of a safety diaphragm which diaphragm is disposed completely within the tire.

Another object of the invention is to provide such mentioned diaphragm which is of the general shape of an open-beaded tire, comprising one or more plies of rubberized fabric which are attached at their edges to annular inextensible bead members, said diaphragm being removably mounted on the aforesaid diaphragm seats.

One type of safety means heretofore known for tubeless tires comprised a diaphragm disposed within a tire so as to divide the tire into inner and outer chambers, such diaphragm having a check valve in its wall adapted to permit the passage of inflationary air therethrough, from the inner to the outer chamber, but to close in the event of a tire blowout. Such tire construction has not proven completely satisfactory because the location of the check valve subjected it to injury due to the flexing and distortion of the diaphragm which resulted in the event of a tire blowout.

A more specific object of the invention is to provide a combination of a tubeless tire and a safety diaphragm so designed and having such characteristics as to make possible the retention, in the event of a tire blowout, of a large volume of air, relative to the total volume of air in a tire, in an inner chamber of said tire which inner chamber is partially defined by said diaphragm, and to provide means for simultaneously inflating said inner and an outer chamber of the tire, said means being in the form of an air passage which by-passes the edge of the diaphragm, the entrance to said passage being through a flutter valve independent of the diaphragm whereby the outer chamber will be concurrently inflated with the inner chamber during normal tire inflation, but the inner chamber will be shut off from the outer chamber in the event of a tire blowout.

These and other objects will be apparent from the following description, reference being had to the drawings in which:

Fig. 1 is a fragmentary sectional view in perspective of a tire and diaphragm embodying the present invention;

Fig. 2 is an enlarged sectional view of a fragment of the tire shown in Fig. 1 taken at the valve portion thereof and shown mounted on a conventional drop center rim; and Fig. 3 is a sectional view taken on line 3—3 of Fig. 2.

Referring now to the drawings, there is shown a tire 10 comprising the usual tread portion 11, sidewall 12, tire plies 13, bead portions 14 and 14a, tire rim 15, and inflation valve identified generally as 16 (see Figs. 1 and 2). Tire 10 is of the straight-side type and is provided with an inside lining 40 composed of butyl of approximately .010" thick, a layer 23 of puncture sealant material at the crown of the tire on the inside thereof, and diaphragm ledges 17 and 17a molded integrally with the tire beads 14 and 14a, respectively. Said ledges are disposed on the lateral inner surface of said beads as shown in the drawing. Ledges 17 and 17a have uninterrupted, radially outwardly facing grooves 18 and 19, respectively, and are preferably composed of flexible rubber and, as will be seen by reference to the drawing, are adapted to receive and seat in said grooves, in substantially fluid type contact, inextensible edge portions 20 and 21 of diaphragm 22, thereby preventing the escape of air from an inner chamber A between said diaphragm edges and their seats into outer chamber B.

The tire 10 may be built or assembled in any usual manner, as for example, upon a shoulder tire-building drum. The ledges 17 and 17a may be formed in any way found satisfactory, as for example, by adding rubber to the lateral inside faces of the tire beads and then molding and vulcanizing the tire, in the usual manner, employing a curing bag, but additionally providing ledge-molding means, at the base of the curing bag, in the form of a bull ring having a contour adapted to mold said ledges to the desired shape. The use of a curing bag and a bull ring in combination to molding a tire at the tire beads is a well-known practice in the tire manufacturing industry and for that reason it is considered unnecessary to describe the molding of ledges 17 and 17a in greater detail.

The diaphragm 22, as will be seen by reference to Fig. 1, comprises a crown wall 1, and sidewalls 2 and 3 composed of two layers of rubberized cord fabric 25 and 26, and also includes the inextensible bead-like edge portions 20 and 21. The plies 25 and 26 preferably consist of strong, light, rayon cord fabric embedded in thin sheets of rubber with the cords of the separate plies crossing at an angle of approximately 45°. Diaphragm 22 may be manufactured in any way found satisfactory, as for example, the plies and inextensible edges may be assembled on a building drum similar to drum tire building, removed from the drum and placed on a curing bag after which the curing bag and diaphragm may be laid in a mold and the diaphragm molded and vulcanized in the general manner of building, molding and vulcanizing tires. Since the diaphragm per se is not claimed in the present application, a detailed description of the diaphragm construction and method of building same is unnecessary.

In mounting the diaphragm 22 in the tire 10, the diaphragm is first inserted within the tire casing in similar fashion as an inner tube is placed in regular tires. After the diaphragm has been so inserted, the edges 20 and 21 of the diaphragm lie adjacent to, but not in, the grooves 18 and 19, respectively. Inextensible edges 20 and 21 are placed in grooves 18 and 19, respectively, by the simple expedient of manually forcing the inextensible members over the rounded, flexible, circumferentially-extending, radially outwardly projecting edges 8 and 9 of ledges 17 and 17a, by pressing by hand or otherwise, the diaphragm edges 20 and 21 against edges 8 and 9, respectively, thereby causing the said inextensible diaphragm edge members to snap into and seat in said grooves 18 and 19, respectively. After the diaphragm has been mounted, as just described, the tire is mounted on its rim in the usual manner, it being understood that the rim may be a standard rim with a tire inner tube valve 16 associated therewith, with the stem in fluid tight relation with the rim and the passage through the valve communicating with the opening between the beads of the tire.

At the time of molding the said diaphragm seating ledge by means of a curing bag and bull ring, an air passage 100 is formed through one of the ledges 17 and 17a. This passage may be formed by building into the ledge, before vulcanizing, a rigid member of the proper size and shape which member is withdrawn after vulcanization leaving said passage 100. Means for forming hole 100 may, if desired, be part of the bull ring itself as will be understood by those familiar with the art of tire manufacturing. Obviously, the passage 100 may be drilled, punched or burned through ledges 17 or 17a and the invention contemplates such and any other expedients which may be found satisfactory. A check valve 101, having a passage 102, is secured to ledge 17a at the entrance to passage 100. In order to avoid the necessity of precise alignment of passages 100 and 102, the entrance to passage 100 is flared, as at 103. Passage 100 is eliptical or elongated in cross-section so that its cross-sectional area may be increased by making the length of said section longer without changing said section width. This is desirable since the diaphragm seats are close to the tire beads and not much thickness of the said ledges is provided in which to form said passage. Check valve 101 is composed of soft flexible rubber and comprises a base 104, a stem 105, said stem terminating at its end, away from its base, in two valve flaps 106 and 107 defining a V-shape space therebetween in such fashion that a sudden rush of air between said flaps into the passage 102 of stem 105 will cause the flaps 106 and 107 to flutter shut, thereby stopping such flow of air.

It will now be seen that valve 101 will permit free passage of air to the outer chamber B of tire 10 during normal inflating, since the velocity of the air therethrough is relatively slow, and that, therefore, chambers A and B of said tire will be simultaneously inflated and have equal inflationary pressure. However, as indicated above, when the air from the inner chamber A of the tire seeks to rush into the outer chamber through valve 101, as will be the case when a tire blowout occurs, valve flaps 106 and 107 will flutter shut and stop the flow of air therethrough. It is to be understood, however, that if desired the flutter valve may be designed to permit a slow flow of air therethrough in the event of a tire blowout so that an automobile upon which a tire embodying the present invention is being used can be brought to a safe stop, but the driver will be warned of the partially deflated condition of the tire so that the tire will not be further damaged by being run farther in its partially deflated condition.

It will now be seen that applicant has provided a safeguard adapted for use in combination with a tubeless tire whereby a blowout of such tire in service will not endanger occupants of an automobile on which the tire is used.

The invention has been illustrated relative to an air passage from the inner chamber A to the outer chamber B through the ledge 17 or 17a. In one form of the invention, a flutter valve is disposed at the entrance of the passage but it is to be understood that the flutter valve 101 may be omitted and a restricted passage alone relied upon, in which case the inner chamber would gradually lose its inflationary air in the event of a tire blowout, but would provide an auxiliary load-carrying means which would deflate only gradually, and thus furnish suitable warning.

The detailed description of the particular embodiments of the invention illustrated and described herein is not to be construed as limiting the invention thereto. The invention includes all features of patentable novelty residing in the foregoing description and the accompanying drawings.

What is claimed is:

1. In the combination of a tubeless tire having diaphragm seating ledges formed inside the tire at the bead portions thereof, a diaphragm of the general shape of an open-beaded tire mounted within said tire on said ledges in substantially air-tight relation therewith, said diaphragm being substantially impervious to air and normally being spaced from said tire except at the immediate area of said ledges thus dividing the tire into an inner and an outer chamber, the improvement which comprises an air passage extending through at least one of said ledges by-passing said diaphragm.

2. In the combination of a tubeless tire having diaphragm seating ledges formed inside the tire at the bead portions thereof, a diaphragm of the general shape of an open-bead tire mounted within said tire on said ledges in substantially air-tight relation therewith, said diaphragm being substantially impervious to air and normally being spaced from said tire except adjacent said ledges, the improvement which comprises an air passage extending through one of said ledges thus dividing the tire into an inner and an outer chamber by-passing said diaphragm and a flutter valve disposed at the entrance of said passage and communicating therewith, said flutter valve being so designed that a normal flow of inflationary air through said valve will not close it, but a more rapid rush of air will cause the valve to close.

3. A two-piece pneumatic tire of the tubeless type comprising, a casing and an inner safety member, said casing having a bead portion with laterally inwardly projecting, circumferentially extending, continuous ledges formed thereon, said safety member being a diaphragm in the general shape of an open-bead tire and having inextensible edge portions, said safety member being removably seated on said ledges in substantially air-tight relation therewith, said safety member being normally spaced from said tire except adjacent said ledges, thus dividing the tire into an inner and an outer chamber, the wall of said safety member being substantially impervious to air, and an air passage extending from said inner chamber to said outer chamber through at least one of said ledges independent of said diaphragm.

4. A two-piece pneumatic tire of the tubeless type comprising, a casing and an inner safety member, said casing having a bead portion with laterally inwardly projecting, circumferentially extending, continuous ledges formed thereon, said safety member being in the form of an open-bead tire having inextensible edge portions removably seated on said ledges in substantially air-tight relation therewith, said safety member being normally spaced from said tire except at said ledges, thus dividing the tire into an inner and an outer chamber, said safety member having walls which are substantially impervious to air, an air passage extending from said inner chamber to said outer chamber through at least one of said ledges and independent of said safety member, a flutter valve disposed at the entrance to said passage and communicating therewith, said valve being adapted to remain open during normal tire inflation and to close in the event of a tire blowout, whereby, in the latter case, air communication between said chambers is at least substantially reduced.

5. A tubeless tire of the open-beaded type characterized by a removable diaphragm normally in contact therewith and therein, said diaphragm having inextensible edge portions and being of the general form of an open-beaded tire, and channel-shaped ledges formed on and integral with the bead portions of the tire to receive the inextensible edge portions of the diaphragm in removable airtight relation therewith, said diaphragm being normally spaced from said tire except at said ledges, whereby the tire is divided into an inner and an outer chamber, said diaphragm being so constructed as to substantially prevent the passage of air therethrough, and an air passage extending through one of said ledges apart from said diaphragm.

6. In combination a tubeless tire having diaphragm seating ledges formed inside the tire at the bead portions thereof, a diaphragm of the general shape of an open-beaded tire mounted within said tire on said ledges in substantially air-tight relation therewith, said diaphragm being substantially impervious to air and normally being spaced from said tire except at the immediate area of said ledges thus dividing the tire into an inner and an outer chamber, and an air passage extending through at least one of said ledges by-passing said diaphragm, said passage being elongated in cross-section.

7. A tubeless tire of the character described comprising bead portions, diaphragm seating ledges formed on the lateral inside of said bead portions, a diaphragm having air impervious walls, which divides the tire into an inner and an outer chamber, said diaphragm removably mounted on said ledges in air-tight relation therewith, at least one of said ledges having an air passageway extending therethrough communicating with both said chambers, said passage having an opening in the lateral inner and the radial outer face of said ledges, said passageway and diaphragm being spaced apart.

8. A tubeless tire of the open-beaded type characterized by a removable diaphragm normally in contact therewith and therein, said diaphragm having an inextensible edge portion and being of the general form of an open-beaded tire, and channel-shaped ledges formed on and integral with the bead portions of the tire to receive the inextensible edge portions of the diaphragm in removable air-tight relation therewith, said diaphragm being normally spaced from said tire except at said ledges whereby the tire is divided into an inner and an outer chamber, and means formed in one ledge for air communication between said chambers.

9. In combination, a tubeless tire of the character described comprising ledges formed on the lateral inside of the bead portions of said tire, a diaphragm of the general shape of an open-beaded tire and having substantially inextensible radially inward edge portions, said diaphragm dividing said tire into inner and outer chambers, said edge portions being removably mounted on said ledges in substantially air-tight relation therewith, and an air passageway joining one of said chambers through said ledges and independent of said diaphragm.

References Cited in the file of this patent

UNITED STATES PATENTS

| | | |
|---|---|---|
| 1,541,867 | Sparks | June 16, 1925 |
| 2,168,514 | Darrow | Aug. 8, 1939 |
| 2,200,916 | Crowley | May 14, 1940 |
| 2,308,955 | Wilson et al. | Jan. 19, 1943 |
| 2,491,491 | Freygang | Dec. 20, 1949 |
| 2,608,235 | Wyman | Aug. 26, 1952 |
| 2,621,700 | Snyder | Dec. 16, 1952 |

OTHER REFERENCES

Tires Service Station, page 36, vol. XXXII, No. 7, 152–342, February 1951.